(12) United States Patent
Briola

(10) Patent No.: US 10,794,232 B2
(45) Date of Patent: Oct. 6, 2020

(54) PLANT AND METHOD FOR THE SUPPLY OF ELECTRIC POWER AND/OR MECHANICAL POWER, HEATING POWER AND/OR COOLING POWER

(71) Applicant: Stefano Briola, Montesilvano (IT)

(72) Inventor: Stefano Briola, Montesilvano (IT)

( * ) Notice: Subject to any disclaimer, the term of this patent is extended or adjusted under 35 U.S.C. 154(b) by 12 days.

(21) Appl. No.: 16/078,970

(22) PCT Filed: Mar. 14, 2017

(86) PCT No.: PCT/IB2017/051471
§ 371 (c)(1),
(2) Date: Aug. 22, 2018

(87) PCT Pub. No.: WO2017/158511
PCT Pub. Date: Sep. 21, 2017

(65) Prior Publication Data
US 2019/0093521 A1    Mar. 28, 2019

(30) Foreign Application Priority Data

Mar. 16, 2016 (IT) .................. 102016000027735

(51) Int. Cl.
*F01K 25/08* (2006.01)
*F01K 17/06* (2006.01)
(Continued)

(52) U.S. Cl.
CPC .............. *F01K 25/08* (2013.01); *F01K 17/02* (2013.01); *F01K 17/06* (2013.01); *F01K 23/02* (2013.01);
(Continued)

(58) Field of Classification Search
CPC ........ F01K 25/08; F01K 23/067; F01K 17/02; F01K 17/06; F02C 6/18
See application file for complete search history.

(56) References Cited

U.S. PATENT DOCUMENTS 9,689,309 B2 *   6/2017  Oelfke ...................... F02C 3/34
9,816,401 B2 * 11/2017  Noureldin ............... F01K 7/025
(Continued)

FOREIGN PATENT DOCUMENTS

| CA | 2671914 A1 | 1/2011 |
| EP | 2669499 A1 | 12/2013 |

(Continued)

OTHER PUBLICATIONS

WO 2009/080994 A3 English Translation (Year: 2009).*
(Continued)

*Primary Examiner* — Shafiq Mian
(74) *Attorney, Agent, or Firm* — Lucas & Mercanti, LLP

(57) ABSTRACT

The object of the present invention is a plant and related method for the supply to the end-user, by making use of the heating power transferred by a heat source e.g. gas, oil products, coal or renewable type e.g. biomass, solar, geothermal, simultaneously with electric power and/or mechanical power, heating power and cooling power "Heating-Cooling" operating mode of the plant or simultaneously with electric power and/or mechanical power and heating power only "Heating" operating mode of the plant or simultaneously with electric power and/or mechanical power and cooling power only "Cooling" operating mode of the plant. The operation of the plant, according to each of the three operation modes, is obtained by the regulation of several on-off valves and a flow rate regulation valve.

16 Claims, 7 Drawing Sheets

(51) Int. Cl.
  *F01K 23/02*   (2006.01)
  *F01K 17/02*   (2006.01)
  *F01K 23/06*   (2006.01)
  *F02C 6/18*    (2006.01)

(52) U.S. Cl.
  CPC .............. *F01K 23/067* (2013.01); *F02C 6/18* (2013.01); *Y02E 20/14* (2013.01)

(56) References Cited

U.S. PATENT DOCUMENTS

| | | | |
|---|---|---|---|
| 9,835,143 B2 * | 12/2017 | Teixeira | .................... F03G 7/05 |
| 2009/0126381 A1 * | 5/2009 | Diaz | ......................... F24H 4/02 |
| | | | 62/238.1 |
| 2014/0208750 A1 * | 7/2014 | Vermeersch | ............ F01K 13/02 |
| | | | 60/646 |

FOREIGN PATENT DOCUMENTS

| | | | | |
|---|---|---|---|---|
| FR | 2924951 A1 | 6/2009 | | |
| WO | 2009142608 A2 | 11/2009 | | |
| WO | WO-2009080994 A3 * | 6/2010 | ................ F02C 3/28 |

OTHER PUBLICATIONS

International Search Report and Written Opinion for Corresponding International Application No. PCT/IB2017/051471 (10 Pages) (dated Jun. 26, 2017).

* cited by examiner

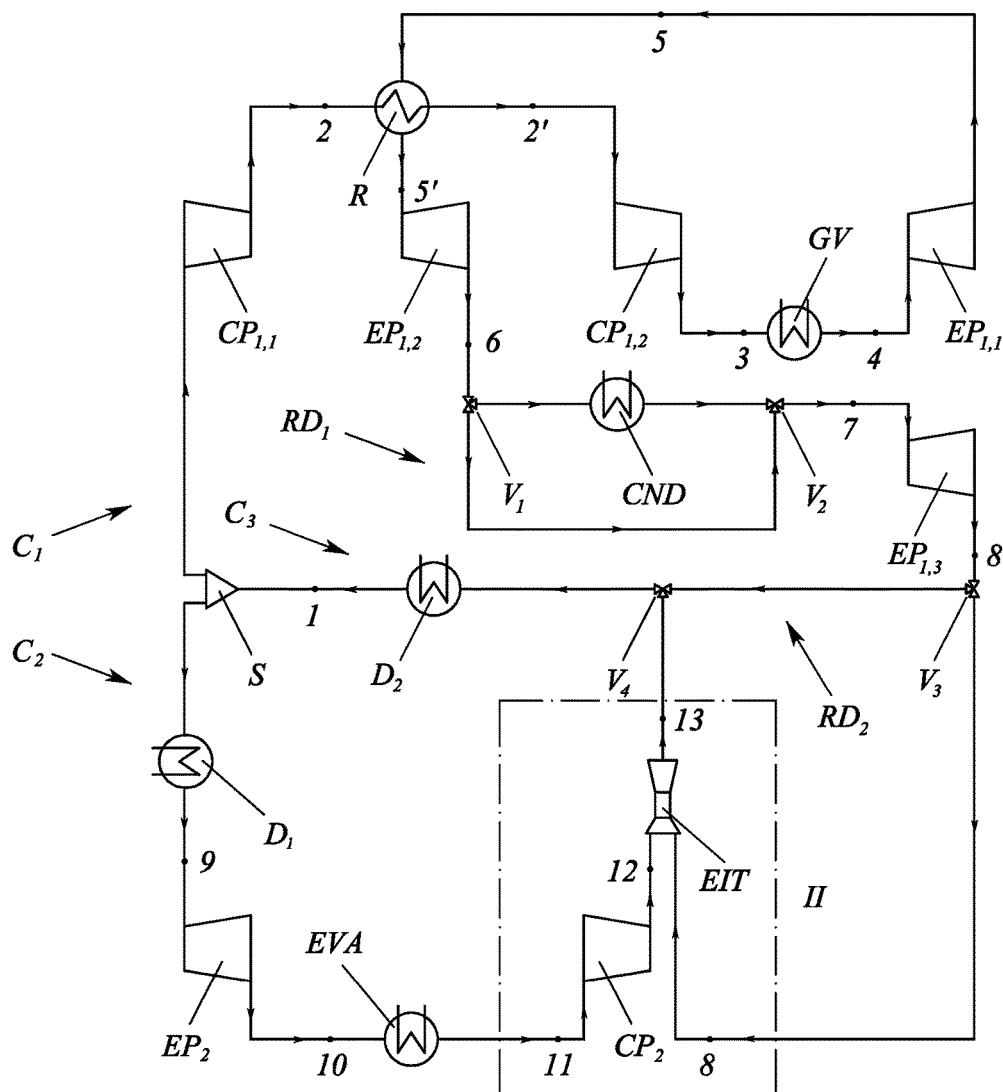
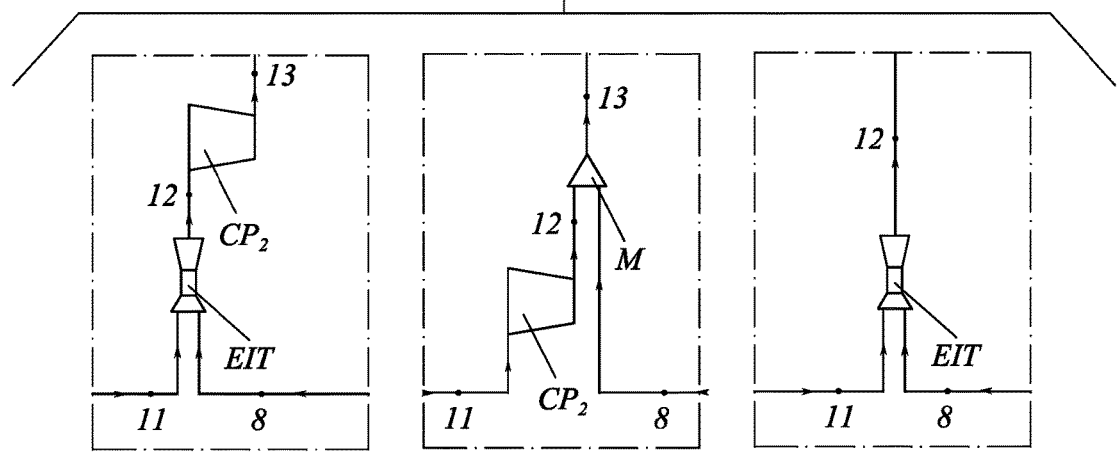
Fig. 1
Fig. 2a  Fig. 2b  Fig. 2c

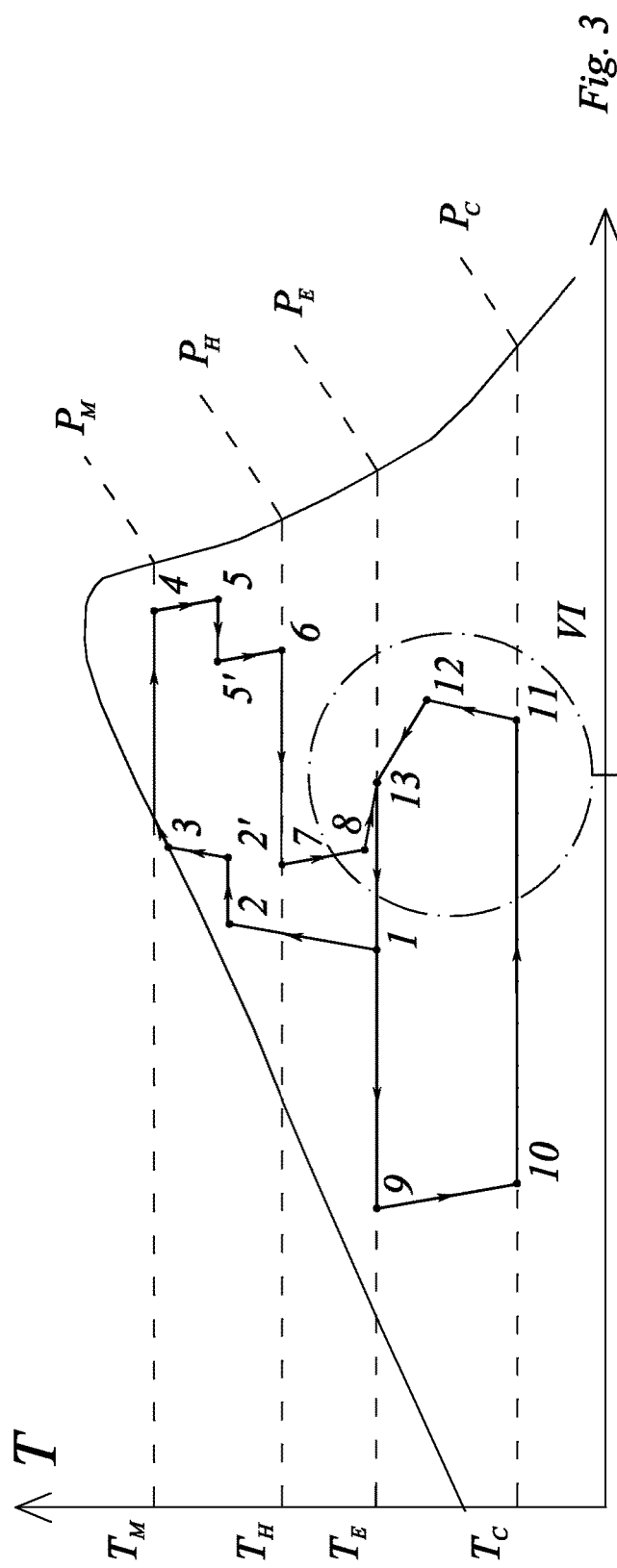
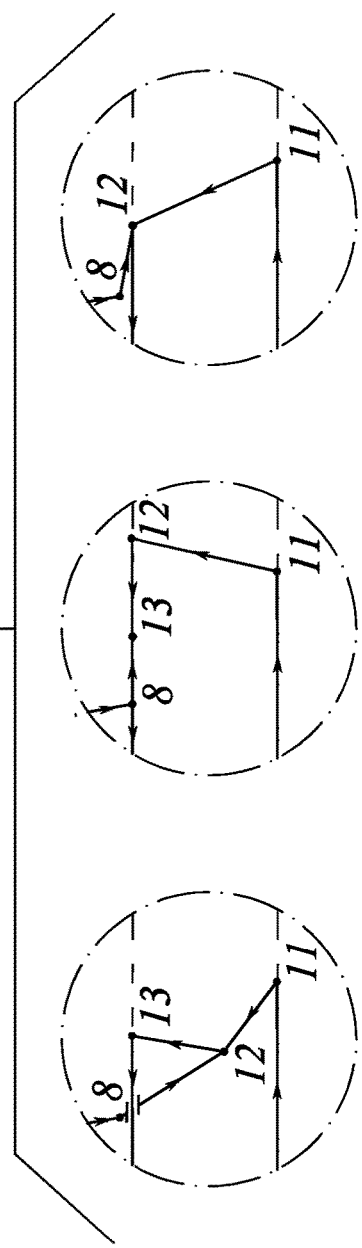
Fig. 3
Fig. 6a  Fig. 6b  Fig. 6c

PLANT AND METHOD FOR THE SUPPLY OF ELECTRIC POWER AND/OR MECHANICAL POWER, HEATING POWER AND/OR COOLING POWER Cross-Reference to Related Applications This application is a 371 of PCT/IB2017/051471, filed Mar. 14, 2017, which claims the benefit of Italian Patent Application No. 102016000027735, filed Mar. 16, 2016.

FIELD OF THE INVENTION

The present invention concerns the field of the energy production plants and in particular it regards a new plant, and related method, for the supply of electric power and/or mechanical power, heating power and/or cooling power.

BACKGROUND OF THE INVENTION

According to the European Directive 2004/8/EC, the cogeneration consists in the production of electric energy and/or mechanical energy and thermal energy in a single process. In particular, a cogeneration plant (Combined Heating Power, CHP) currently on the market is constituted by a prime mover (usually steam turbine, gas turbine, microturbine, internal combustion engine, Stirling engine, fuel cell) for the supply of electric power and/or mechanical power to the end-user and a heat recovery system, that uses the thermal cascade from the prime mover, for the supply of heating power to the end-user.

A currently marketed trigeneration plant (Combined Cooling Heating Power, CCHP) is constituted by the previously defined cogeneration plant, for the supply of electric power and/or mechanical power and heating power to the end-user, and by a device for the supply of cooling power to the end-user. The cooling device can be thermally activated (e.g. absorption or adsorption chiller) by making use of the thermal cascade from said heat recovery system or even mechanically or electrically activated (e.g. vapor compression refrigeration cycle) by making use of the electric power and/or mechanical power provided by said prime mover of the cogeneration plant.

On the other hand, in the field of the technology directed to the supply to the end-user of heating power and/or cooling power and possibly also of electric power and/or mechanical power, some plants (and respective methods) operating with two-phase fluid expanders and/or two-phase fluid compressors were proposed. Such non conventional expansion and compression devices are briefly described hereafter.

Unlike traditional expansion devices (steam turbine, gas turbine, hydraulic turbine and wind turbine), a two-phase fluid expander is capable to work with a chemical species in the wet saturated vapor phase (namely constituted by a share in the saturated liquid phase and a share in the dry saturated vapor phase), converting its thermodynamic energy in electric (or mechanical) energy, by means of simultaneous expansion of said two phases. Such technology can be classified, as the traditional single-phase fluid machines, according to the following two categories: a) Volumetric two-phase fluid expanders (twin screw, scroll, rotating vanes, alternating or rolling pistons); b) Dynamic two-phase fluid expanders (impulse axial or tangential flow, impulse-reaction radial flow and reaction radial flow). An extensive bibliographic overview of such technology is reported in [1].

In particular, the isentropic efficiency of the impulse axial flow two-phase fluid expander commercialized by Energent Corp. [2] and of the impulse-reaction radial flow two-phase fluid expander commercialized by Ebara International Corp. [3] reaches values equal to about 0.80 and 0.90, respectively.

In relation to the two-phase fluid compressor, unlike traditional compression devices (circulation pump and single-phase compressor), this is capable to simultaneously determine the increase of the pressure of the two phases (saturated liquid and dry saturated vapor) of a chemical species in the wet saturated vapor phase by making use of the electric (or mechanical) power provided by an external motor. Such technology can be classified, as traditional single-phase compressors, according to the following two categories: a) Volumetric two-phase fluid compressors (alternating or rolling pistons, membrane, single or twin screw, rotating vanes, scroll and liquid ring); b) Dynamic two-phase fluid compressors (axial or radial flow).

Further devices for the two-phase fluid compression process are multiphase pump and adiabatic two-phase diffuser. An extensive bibliographic overview of the two-phase fluid compressors is again reported in [1]. To date such technology is not available on the market, mainly due to the modest values, empirically obtained, of the isentropic efficiency. However, a mathematical model, specifically elaborated for the simulation of the two-phase fluid compression process of ammonia in a twin screw oil-free two-phase compressor, demonstrated that the isentropic efficiency reaches the value equal to about 0.89 [4].

Different plants (and respective methods) operating with two-phase fluid expanders and/or two-phase fluid compressors for the supply to the end-user of heating power and/or cooling power and possibly also of electric power and/or mechanical power are present in the state of the art.

In a plant described in [1], [5], the working fluid circulates in a closed circuit consisting of the following components in sequence: circulation pump, isobaric vapor generator wherein heating power is transferred by a heat source to the working fluid, two-phase fluid expander, isobaric evaporator, single-phase single-stage or multi-stage intercooled compressor and finally isobaric condenser. The plant supplies to the end-user heating power in the condenser and/or cooling power in the evaporator. Moreover, in correspondence to suitable operating conditions, the plant can also supply to the end-user electric power (and/or mechanical power) because in such conditions the electric power and/or mechanical power produced in the two-phase expander is higher than the overall electric power and/or mechanical power requested by the circulation pump and compressor.

In a further plant described in [6], the working fluid circulates in a closed circuit consisting of the following components in sequence: isobaric condenser, isobaric thermal regenerator hot-side, lamination valve, isobaric evaporator, isobaric thermal regenerator cold-side and finally two-phase compressor. This plant supplies to the end-user heating power in the condenser and/or cooling power in the evaporator but it is not able to supply to the end-user electric power (or mechanical power).

SUMMARY OF THE INVENTION

Taking the above into consideration, the main object of the present invention is to provide a plant and method for the supply to the end-user of electric power and/or mechanical power, heating power and/or cooling power, which provides at least the following two advantages compared to both currently commercialized CCHP plants and CCHP plants operating with two-phase fluid expanders and/or two-phase fluid compressors present in the state of the art:

1) capability to satisfy the electric power (and/or mechanical power), heating power and cooling power requirements of the end-user with considerably higher flexibility;

2) higher values of the thermodynamic performances indicators of the plant.

This and further objects are achieved with the plant and method according to the present invention, the essential characteristics of which are defined by the independent claims here attached. Other important secondary characteristics are encompassed by the dependent claims.

BRIEF DESCRIPTION OF THE DRAWINGS

The characteristics and advantages of the plant and method according to the present invention will become apparent from the following description of its embodiments, given by way of example and not limitative, with reference to the accompanying drawings in which:

FIG. 1 is a circuital scheme of a plant according to a first embodiment of the invention;

Figure 4:
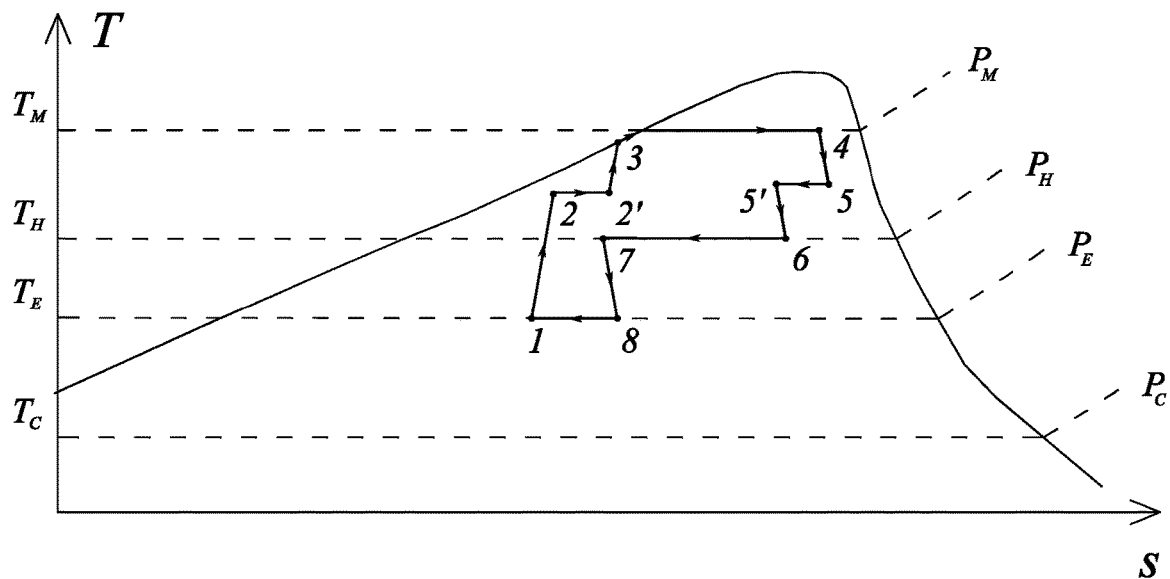
Figure 5:
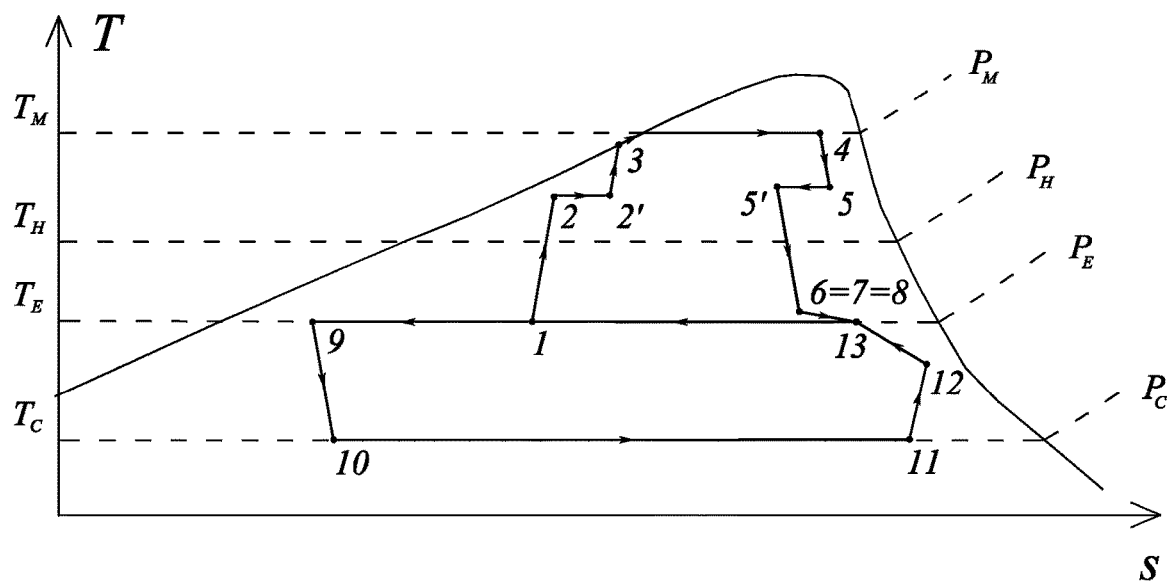
Figure 7:
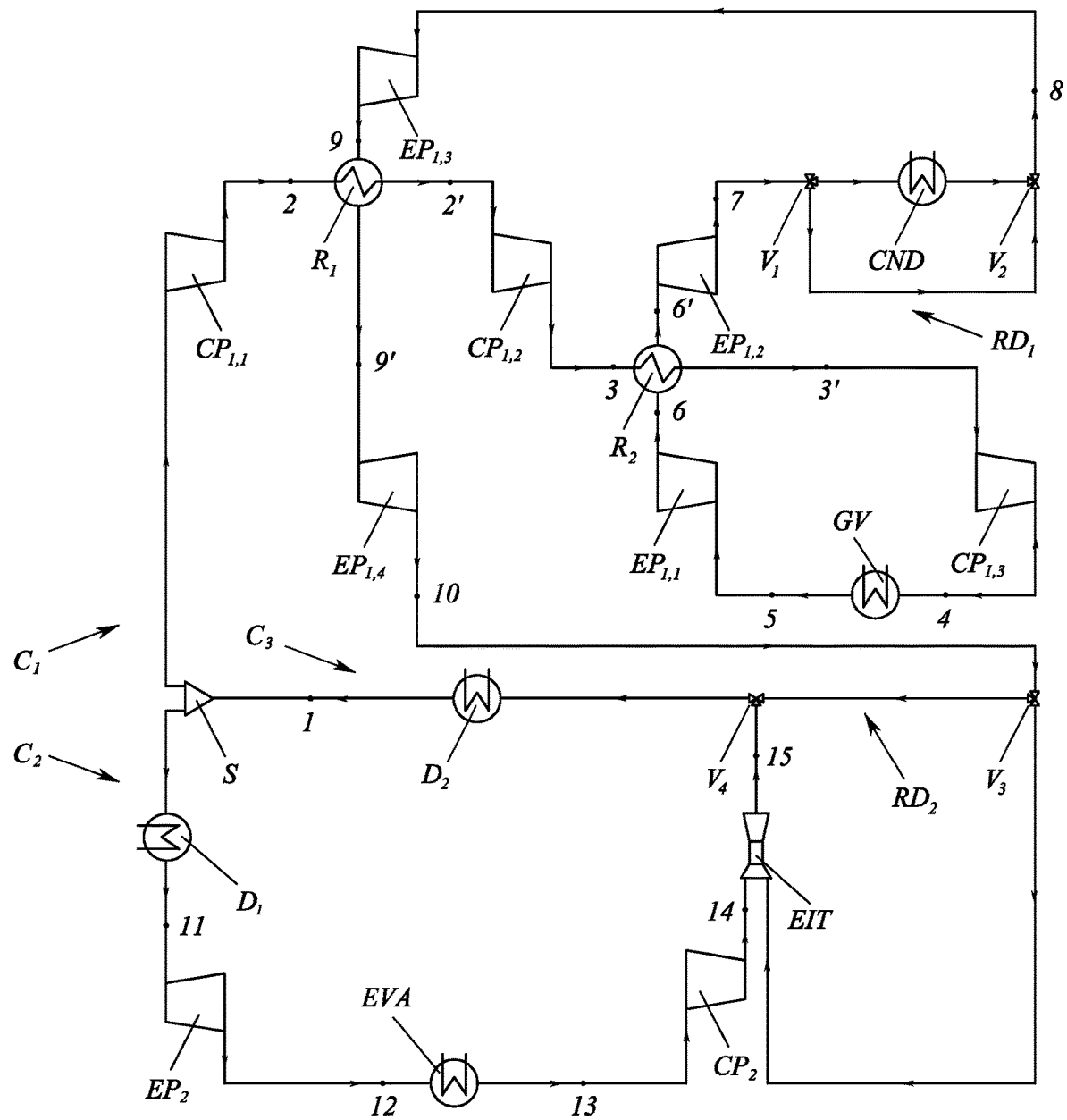
Figure 8:
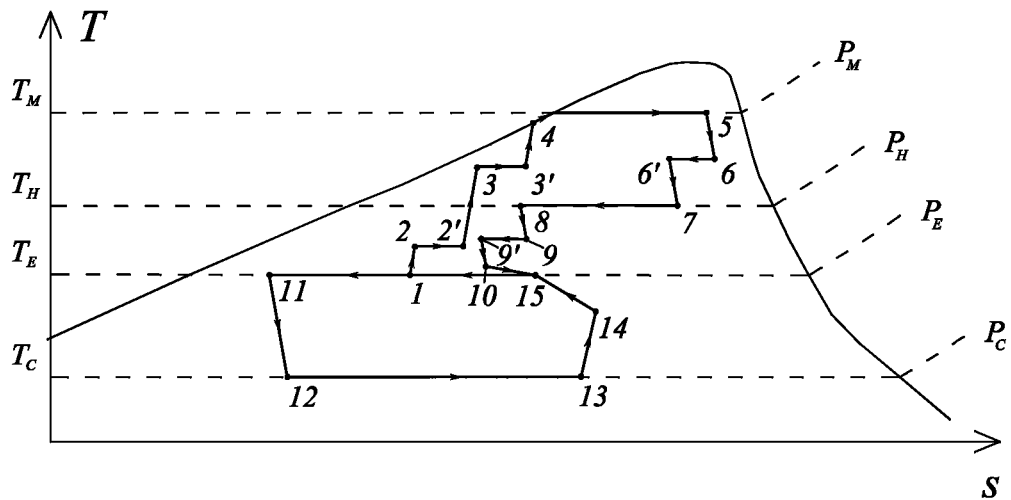
Figure 9:
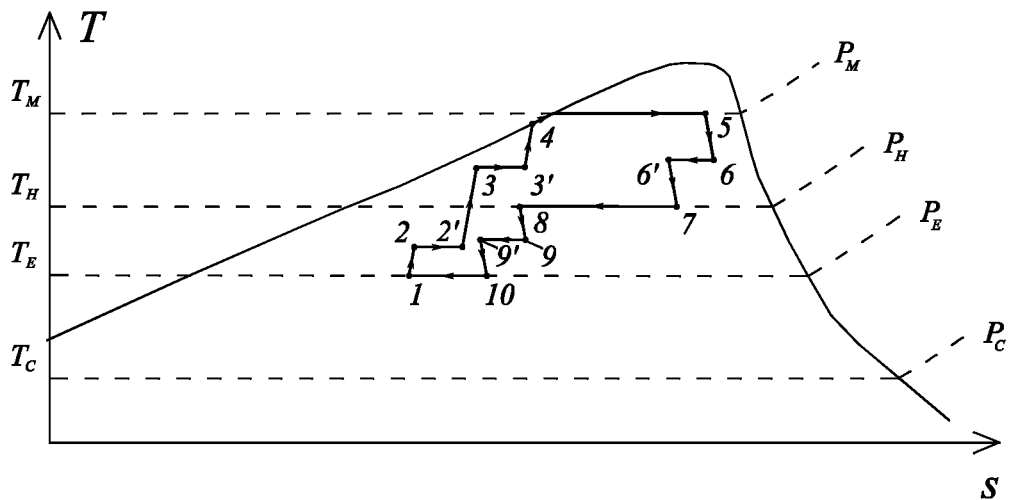
Figure 10:
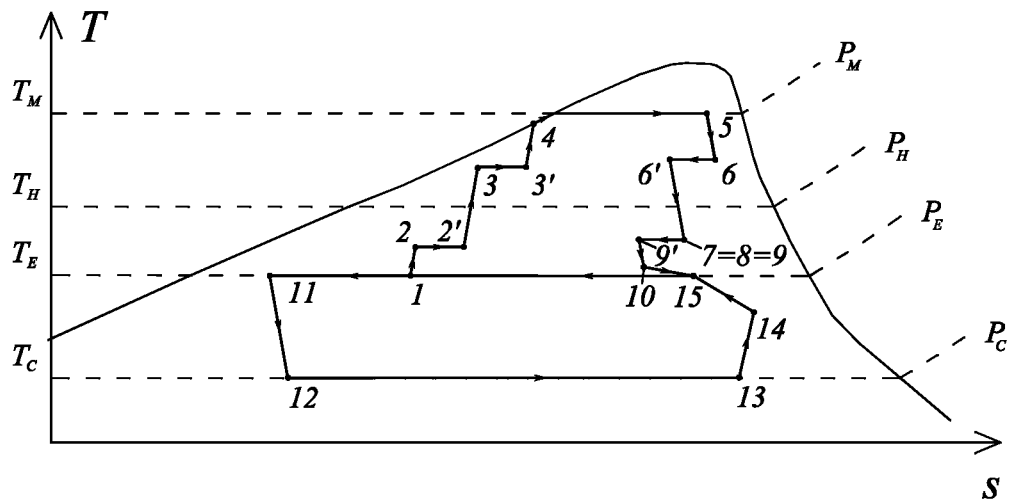
Figure 11:
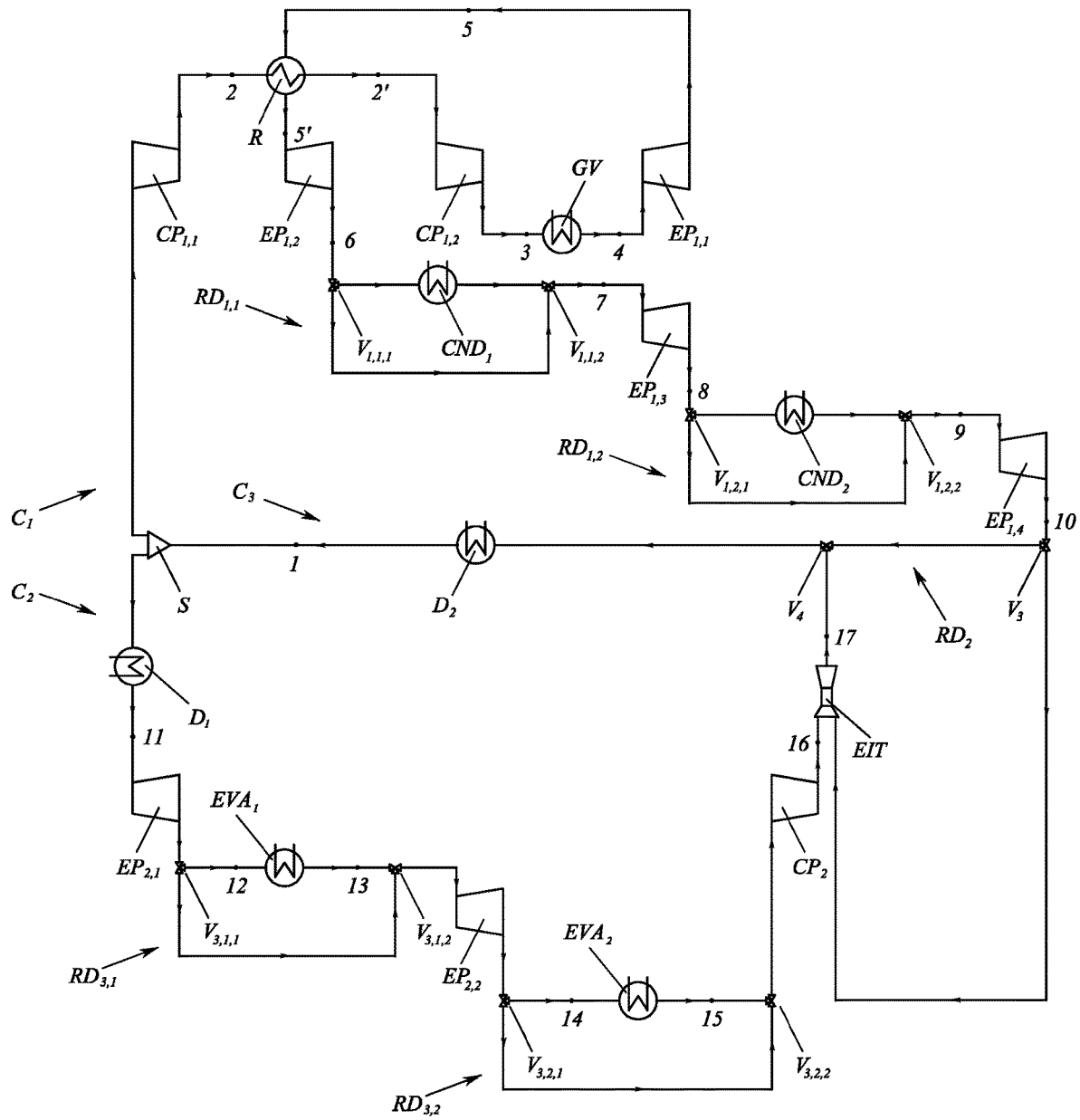
Figure 12:
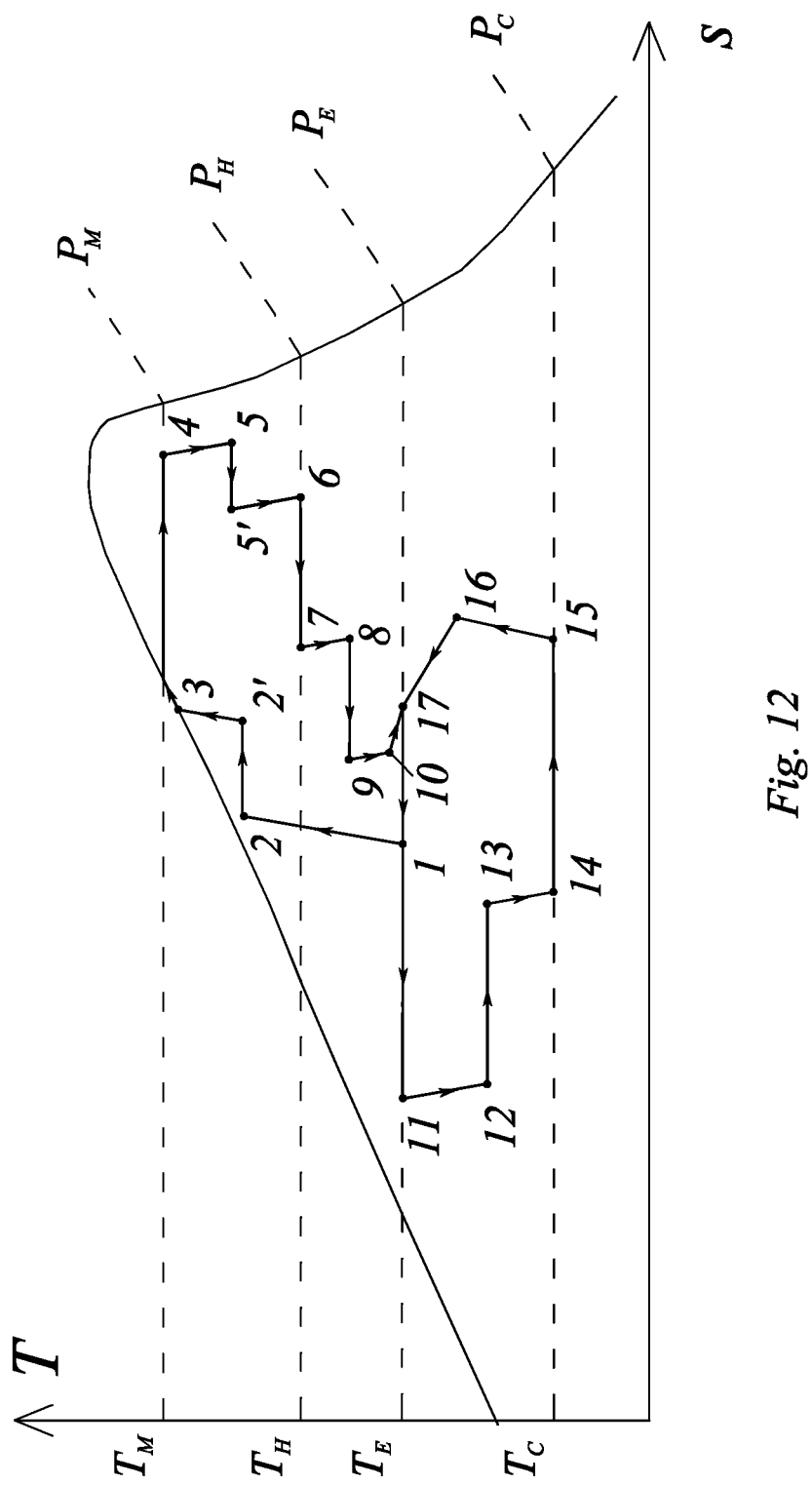

FIGS. from 2a to 2c are respective variants of the area surrounded by the square II of FIG. 1;

FIGS. from 3 to 5 are temperature-entropy (specific entropy) qualitative diagrams, representative of the method according to the present invention in the plant of FIG. 1, respectively in operating mode of the plant for the supply of electric power and/or mechanical power, heating power and cooling power (FIG. 3), for the supply of electric power and/or mechanical power and heating power only (FIG. 4), and for the supply of electric power and/or mechanical power and of cooling power only (FIG. 5);

FIGS. 6a, 6b and 6c show, in relation to the FIG. 3, respective variants of the diagram in the area surrounded by the circle VI and corresponding to the circuital variants of the FIGS. from 2a to 2c, respectively, said variants of the diagram in the FIGS. 6a, 6b and 6c and the corresponding circuital variants of the FIGS. from 2a to 2c being associable also to the diagram of FIG. 5 and to those of the successive FIGS. 8 and 10;

FIG. 7 is a circuital scheme of a plant according to a second embodiment of the invention;

FIGS. from 8 to 10 are temperature-entropy (specific entropy) qualitative diagrams, representative of the method according to the present invention in the plant of FIG. 7, respectively in operating mode of the plant for the supply of electric power and/or mechanical power, heating power and cooling power (FIG. 8), for the supply of electric power and/or mechanical power and heating power only (FIG. 9), and for the supply of electric power and/or mechanical power and cooling power only (FIG. 10);

FIG. 11 is a circuital scheme of a plant according to a third embodiment of the invention;

FIG. 12 is a temperature-entropy (specific entropy) qualitative diagram representative of the method according to the present invention in the plant of FIG. 11 in operating mode of the plant for the supply of electric power and/or mechanical power, heating power and cooling power, the diagrams related to the other operating modes (to which the variants referred to the previous FIGS. 6a, 6b and 6c are in turn applicable) being also inferable in an obvious way by this same diagram.

DETAILED DESCRIPTION OF THE INVENTION

With reference for the time being to the FIGS. from 1 to 6c, a plant according to the present invention is adapted to the supply to an end-user of electric power and/or mechanical power and simultaneously of heating power and/or cooling power by making use of a single working fluid adapted to absorb heating power transferred by any typology of heat source (renewable e.g. biomass, solar, geothermal, thermal cascade from industrial processes or traditional e.g. oil products, natural gas, coal). On the contrary, in the currently marketed CCHP systems, the typology of the working fluid circulating in the prime mover is in general different from the typology of the working fluid circulating in the device (thermally or electrically or mechanically activated) adapted to the supply of cooling power to the end-user.

The plant under consideration can operate with a working fluid of typology "wet" or "dry" (the distinction between "wet" and "dry" fluids takes place, as known, in connection with the different configuration of the dry saturated vapor curve); moreover, said working fluid can be single-component (namely constituted by a single chemical species) or azeotropic multi-component (namely constituted by several chemical species). In both such fluid typologies, during the isobaric condensation or isobaric evaporation, the temperature is constant and also the composition of the vapor phase is equal to the composition of the liquid phase. Otherwise, the plant under consideration can operate with multi-component non azeotropic fluid (e.g. water-ammonia). In such fluid typology, during the isobaric condensation or isobaric evaporation, the temperature changes and also the composition of the vapor phase is different compared to the composition of the liquid phase. The thermodynamic performances of the plant can vary with the change in said fluid typologies.

Therefore, the plant in the first embodiment, starting from an isenthalpic flow rate regulation means S for the isenthalpic distribution of the overall working fluid flow rate in two shares, includes a first circuit $C_1$ that comprises first adiabatic two-phase compression means, materialized in this case by two successive mechanical compressors $CP_{1,1}$ and $CP_{1,2}$ adapted to increase the pressure and consequently the temperature of the working fluid, powered by a fraction of the electric power and/or mechanical power on the whole generated by the plant as will be discussed hereafter.

In the first circuit $C_1$ of the plant under consideration, an isobaric thermal regeneration means R is arranged between said two compressors, in particular a countercurrent heat exchanger, whose process will be better understood shortly.

Downstream of the first adiabatic two-phase compression means, an isobaric vapor generation means GV uses the heating power transferred by a heat source, and it precedes first adiabatic expansion means, in this case three stages $EP_{1,1}$, $EP_{1,2}$ and $EP_{1,3}$ of which at least the last $EP_{1,3}$ exclusively includes adiabatic two-phase expansion means. Electric power and/or mechanical power is produced by said first adiabatic expansion means, whence the above cited fraction necessary to power the compressors used in the plant. More generally speaking, first adiabatic expansion means $EP_{1,N+1}$ in the first circuit comprise at least two stages (upstream of said last stage) exclusively comprising adiabatic two-phase expanders, or adiabatic vapor turbines followed or preceded by adiabatic two-phase expanders, or even exclusively adiabatic vapor turbines.

The first circuit is configured in such a way that the thermal regeneration means R intercepts the working fluid downstream of the first stage of adiabatic expansion, so as to promote the isobaric thermal regeneration by transfer of heating power to the working fluid downstream of the first stage of adiabatic two-phase compression.

Then, the first circuit includes isobaric condensation means CND adapted to condense said working fluid with resulting supply to the end-user of heating power.

In parallel to the first circuit, again starting from the flow rate regulation means S, a second circuit $C_2$ develops, including a first isobaric thermal dissipation means $D_1$ adapted to promote the heat transfer from said working fluid to the external environment, a second expansion means $EP_2$ adapted to generate electric power and/or mechanical power due to the adiabatic two-phase expansion of the working fluid, and then an evaporation means EVA adapted to supply to the end-user cooling power by isobaric evaporation of the working fluid.

Downstream of the evaporation means, second adiabatic two-phase compression means are then used in order to increase the pressure and consequently the temperature of the working fluid. As shown in FIGS. 1 and from 2a to 2c, said compression means can be configured according to different variants.

In particular, they can exclusively comprise one or more adiabatic two-phase compression means $CP_2$ powered by means of a fraction of the electric power and/or mechanical power on the whole generated by the same plant (FIG. 2b). In this case, an isenthalpic mixing means M takes the task of an output interface with the first circuit, in particular mixing the share of the working fluid circulating in the second circuit with that previously addressed towards the first circuit and circulated in it.

A second and a third variant (in FIGS. 1 and 2a, respectively) provide for an adiabatic two-phase ejection means EIT, which also receives the share of the working fluid in the first circuit and which therefore also carries out the (re) combination between the two shares of the working fluid, and one or more of said adiabatic two-phase compression means $CP_2$ located upstream (FIG. 1) or downstream (FIG. 2a) of said adiabatic two-phase ejection means EIT. Furthermore, in a fourth variant (FIG. 2c), the compression process in the second circuit is solely carried out in an adiabatic two-phase ejection means EIT, also in this case clearly with the task of a functional connection with the first circuit.

In particular, an adiabatic two-phase ejection means realizes the increase of the pressure of the second share of the working fluid circulating in the second circuit (secondary fluid) using the thermodynamic energy of the first share of the working fluid circulating in the first circuit (primary fluid), the latter having higher pressure at the inlet compared to that of the secondary fluid at the inlet. Thus, the working fluid at the outlet of the adiabatic two-phase ejection means, obtained by mixing the two said shares in the same ejection means, reaches an higher pressure compared to the pressure of the secondary fluid at the inlet.

A third circuit $C_3$ branches off downstream of the adiabatic two-phase compression means $CP_2$, EIT and it is adapted to function as a connection between the outlets of the first and second circuit and the flow rate regulation means S. Upstream of the latter, the third circuit comprises second isobaric thermal dissipation means $D_2$ which promote the heat transfer from the working fluid to the external environment.

The plant further comprises a plurality of bypass branches among which in particular a first deviation branch $RD_1$ that departs from the first circuit and bypasses the condenser CND, in particular extending between a first three way on-off valve $V_1$ and a second three way on-off valve $V_2$.

Finally, a second deviation branch $RD_2$ extends between the first circuit $C_1$ downstream of the last stage of adiabatic expansion $EP_{1,3}$ and the third circuit $C_3$ upstream of the second isobaric thermal dissipation means $D_2$, practically bypassing the whole second circuit $C_2$. More precisely, in the example, said second deviation branch is delimited by a third three way on-off valve $V_3$ located downstream of the expansion means $EP_{1,3}$ and by a fourth three way on-off valve $V_4$ located between the second adiabatic two-phase compression means $CP_2$ and/or EIT and the second thermal dissipation means $D_2$.

All the above mentioned components are to be considered as known to the skilled person when considered per se, in their nature and construction. Nevertheless, for the sake of completeness, it is noted that an extensive overview of two-phase expanders is for example provided in [1] and includes, among the currently marketed more performing two-phase fluid expanders, the impulse-reaction radial flow two-phase expander in [3] and the impulse axial flow two-phase expander in [2]. Similarly, examples of mechanical two-phase compressor can be found in [1], which in particular discloses the mechanical two-phase twin screw compressor in [4]. Finally, an example of a two-phase ejector, in particular the two-phase condensing ejector, is reported in [7].

The latter operates with primary and secondary fluids at the inlet both in the wet saturated vapor phase (in particular, the quality of the secondary fluid at the inlet is close to the unit value), the velocity of the primary fluid at the inlet being remarkably higher compared to that of the secondary fluid, and also the pressure of the secondary fluid at the inlet being not significantly lower compared to that of the primary fluid at the inlet. In this situation, the high velocity of the heat exchange (wherein thermal power is transferred by the vapor phase to the liquid phase) implies the high condensation velocity of the vapor phase with resulting high momentum exerted by the primary fluid.

It follows that the pressure of the fluid at the outlet of the ejector results higher, compared to the pressures of both the primary and the secondary fluid at the inlet. With the appropriate optimization solutions, said ejector is capable to operate according to the following operating conditions: quality of the secondary fluid at the inlet significantly lower than the unit value, pressure of the secondary fluid at the inlet remarkably lower compared to the pressure of the primary fluid at the inlet, and finally pressure of the fluid at the outlet of the ejector intermediate between the pressures of the two fluids (primary and secondary) at the inlet.

From an operational standpoint, the three alternative operating modes according to which the plant is configurable, in particular by acting on the regulation systems determined by the above mentioned flow rate regulating valve S and on-off valves $V_1 \div V_4$, can be macroscopically outlined as follows.

In an operating mode of the plant for the supply to the end-user, as well as electric power and/or mechanical power, simultaneously of heating power and cooling power, a first share of the working fluid, downstream of the flow rate regulating valve S, is fed in the first circuit through (also) the condensation means CND and the first adiabatic expansion means $EP_{1,1}$, $EP_{1,2}$ and $EP_{1,3}$ towards the second adiabatic two-phase compression means $CP_2$ and/or EIT in the second circuit, whereas the second share of the working fluid is processed in the second circuit. The two shares of the working fluid are recombined at the block inside the square II of FIG. 1, with the aforementioned different alternative modes.

In an operating mode of the plant for the supply to the end-user, as well as electric power and/or mechanical power, simultaneously of cooling power only, once again the distribution of the working fluid in two shares by means of the flow rate regulation valve S occurs as in the previous case; however the first share of the working fluid in the first circuit passes in this case through the first deviation branch $RD_1$ bypassing the condensation means CND. The two shares of the working fluid are recombined at the block inside the square II of FIG. 1, with the aforementioned different alternative modes.

Finally, in an operating mode of the plant for the supply to the end-user, as well as electric power and/or mechanical power, simultaneously of heating power only, the overall flow rate of the working fluid is fed in the first circuit, through (also) the condensation means CND and getting to the third three way on-off valve $V_3$ it is addressed in the second deviation branch $RD_2$ directly towards the third circuit through the fourth three way on-off valve $V_4$ (thus, the second circuit remains de facto inactive).

The electric power and/or mechanical power supplied to the end-user is evidently equal to the difference between that overall power produced by all the expanders of the plant deducted of the electric power and/or mechanical power absorbed by all the compressors of the plant.

More specifically, in relation to the evolution of the closed sequence of thermodynamic transformations in the different operating modes of the plant, with particular reference to the diagrams of FIGS. from 3 to 5, the "Heating-Cooling" operating mode of the plant is at first considered, namely the mode according to which the electric power and/or mechanical power, heating power and cooling power are simultaneously provided to the end-user.

In particular, the temperature-entropy qualitative diagram in FIG. 3 (and related FIGS. 6a, 6b and 6c) is associated with the plant operating with the single-component working fluid of "wet" typology and it can be described as follows (the numerical references are shown in suitable position also in the circuital scheme, for the sake of easier understanding). With elementary and obvious modifications to said diagram, it is possible to associate the temperature-entropy qualitative diagram to the plant operating with the single-component working fluid of "dry" typology or with the multi-component working fluid (azeotropic or non-azeotropic) of typology "wet" or "dry".

Transformations 1-2-2'-3

The working fluid in the wet saturated vapor phase (point 1) at temperature $T_E$ and pressure $P_E$ of condensation, the temperature $T_E$ being suitable for the heat exchange with the external environment (atmospheric air, or underground, or sea water or river or even a possible end-user of heating power), is directed to the flow rate regulation valve S, wherein the overall flow rate of the working fluid is subject to isenthalpic distribution in the two shares.

In particular, the first share of the working fluid flow rate is processed in the first circuit $C_1$ and therein subject to adiabatic two-phase compression (by means of $CP_{1,1}$ and $CP_{1,2}$), wherein it is pressurized up to the maximum pressure of the thermodynamic cycle $P_M$, exiting at the temperature of compression end in the subcooled liquid phase (point 3).

Alternatively, the working fluid exiting from the whole adiabatic two-phase compression can be in the saturated liquid phase or wet saturated vapor phase (cases not shown at point 3 of FIG. 3).

In said transformation 1-2-2'-3, an isobaric thermal regeneration (realized in the heat exchanger R) is noted, due to the heating power transferred by the working fluid circulating in the wet saturated vapor phase in the hot side (line 5-5') of said heat exchanger R located downstream of the first stage of adiabatic expansion (successive transformation which will be described further on), to the same working fluid circulating in the wet saturated vapor phase in the cold side (line 2-2') of the same heat exchanger R located downstream of the first two-phase compression stage $CP_{1,1}$.

Alternatively, the working fluid at the inlet of the cold side of the heat exchanger R can be in the subcooled liquid phase or saturated liquid phase (cases not shown at point 2 of FIG. 3).

Transformation 3-4

The working fluid at the outlet of the whole adiabatic two-phase compression (point 3) is directed to the vapor generator GV wherein it absorbs (at constant pressure $P_M$) the heating power transferred by the heat source exiting in correspondence to the maximum temperature of the thermodynamic cycle $T_M$ in the wet saturated vapor phase (point 4).

Alternatively, the working fluid in the vapor generator GV can be in one of the following cases (not shown at points 3 and 4 of FIG. 3): a) at the inlet in the subcooled liquid phase and at the outlet in the subcooled liquid phase, or saturated liquid, or dry saturated vapor, or superheated vapor, or even supercritical phase; b) at the inlet in the saturated liquid phase or wet saturated vapor phase and at the outlet in the wet saturated vapor phase, or dry saturated vapor, or superheated vapor, or even supercritical phase.

Transformations 4-5-5'-6

The working fluid at the outlet of the vapor generator (point 4) is subject to the first adiabatic expansion in $EP_{1,1}$ and $EP_{1,2}$ from $P_M$ and $T_M$ to pressure and temperature of expansion end $P_H$ and $T_H$, thus obtaining the production of electric power and/or mechanical power and exiting in the wet saturated vapor phase (point 6), the temperature $T_H$ being suitable for the supply to the end-user of heating power.

Alternatively, the working fluid in the first adiabatic expansion in $EP_{1,1}$ and $EP_{1,2}$ can be in one of the following conditions (not shown at points 4 and 6 of FIG. 3): a) at the inlet in supercritical phase or superheated vapor and at the outlet in superheated vapor phase, or dry saturated vapor, or even wet saturated vapor; b) at the inlet in dry saturated vapor phase and at the outlet in wet saturated vapor phase or in superheated vapor phase; c) at the inlet in wet saturated vapor phase and at the outlet in dry saturated vapor phase or also in superheated vapor phase; d) at the inlet in subcooled liquid or saturated liquid phase and at the outlet in wet saturated vapor phase.

In this transformation 4-5-5'-6, the isobaric thermal regeneration referred above (hot side of the heat exchanger R in the line 5-5') can be noticed.

Alternatively, the working fluid can be in the hot side of the heat exchanger R in one of the following conditions (not shown at points 5 and 5' of FIG. 3): a) at the inlet in the superheated vapor phase and at the outlet in the superheated vapor phase, or dry saturated vapor, or wet saturated vapor, or saturated liquid, or even subcooled liquid; b) at the inlet in the dry saturated vapor phase or wet saturated vapor phase and at the outlet in the wet saturated vapor phase, or saturated liquid, or even subcooled liquid.

Transformation 6-7

At the end of the expansion just mentioned (point 6), the working fluid is directed to the condenser CND wherein due to isobaric condensation it performs the supply to the end-user of heating power, exiting in wet saturated vapor phase (point 7).

Alternatively, the working fluid can be in the condenser in one of the conditions (not shown at points 6 and 7 of FIG. 3) similarly as described for the hot side of the heat exchanger R (line 5-5').

Transformation 7-8

A further stage of first adiabatic expansion in $EP_{1,3}$ with contextual production of electric power and/or mechanical power leads the working fluid in wet saturated vapor phase (point 8) in correspondence to temperature and pressure values higher than the abovementioned values $T_E$ and $P_E$, respectively.

Transformation 1-9

The second share of the working fluid flow rate at the outlet of the flow rate regulation valve S in the wet saturated vapor phase (point 1) is processed as described in the second circuit $C_2$ wherein it is subject to a heat exchange in an isobaric thermal dissipation means $D_1$, transferring thermal power in the external environment, exiting in the wet saturated vapor phase (point 9).

Alternatively, the working fluid can be at the outlet of the isobaric thermal dissipation means $D_1$ in the subcooled liquid phase or saturated liquid (cases not showed at point 9 of FIG. 3).

Transformation 9-10

The working fluid is subject at this point to a second adiabatic two-phase expansion (in $EP_2$) wherein it performs the production of electric power and/or mechanical power, up to the pressure $P_c$ and temperature $T_c$ of evaporation, exiting in the wet saturated vapor phase (point 10), the temperature $T_c$ being suitable for the supply to the end-user of cooling power.

Transformation 10-11

Thus, from point 10, an isobaric evaporation in the evaporator EVA takes place with contextual supply to the end-user of cooling power, exiting in the wet saturated vapor phase (point 11).

Transformations 8-13, 11-12-13 (FIG. 3 Corresponding to the Scheme of FIG. 1)

In the case of the circuital solution as in FIG. 1, and with reference to FIG. 3, the second share of the working fluid at the outlet of the evaporator EVA (point 11) is subject to a mechanical two-phase compression at low pressure in $CP_2$ (powered by a fraction of the overall electric power and/or mechanical power produced by the expanders of the plant) exiting in the wet saturated vapor phase or dry saturated vapor phase (point 12), and then it is subject to an adiabatic two-phase ejection process in EIT by making use of the thermodynamic energy of the first share of the working fluid in the first circuit at the inlet of EIT (point 8). The working fluid, obtained due to the combination of the two shares, exits from EIT at pressure $P_E$ and temperature $T_E$ in wet saturated vapor phase (point 13).

Transformations 8-12, 11-12, 12-13 (FIG. 6a Corresponding to the Scheme of FIG. 2a)

In the case of the circuital solution as in FIG. 2a, according to the corresponding diagram of FIG. 6a, the working fluid (second share) at the outlet of the evaporator EVA (point 11) is directly subject to an adiabatic ejection process in EIT by making use of the thermodynamic energy of the first share of the working fluid in the first circuit at the inlet of EIT (point 8), to converge in the thermodynamic state indicated by point 12 in the wet saturated vapor phase, and subsequently to the mechanical two-phase compression in $CP_2$ arriving to pressure $P_E$ and temperature $T_E$ in the wet saturated vapor phase or dry saturated vapor phase (point 13).

Transformations 8-13, 11-12-13 (FIG. 6b Corresponding to the Scheme of FIG. 2b)

In this case (scheme of FIG. 2b), the second share of the working fluid, as in case of FIG. 1, is subject to an adiabatic two-phase compression ($CP_2$) directly arriving to the pressure $P_E$ and temperature $T_E$ in point 12 in wet saturated vapor phase or dry saturated vapor. From here, isenthalpic mixing with the first share of the working fluid at the outlet of the first adiabatic expansion of the first circuit (point 8) takes place. The two shares of the working fluid, exactly at the same pressure $P_E$, are mixed with each other in M, from which the overall working fluid flow rate exits in the wet saturated vapor phase (point 13).

Transformations 8-12 and 11-12 (FIG. 6c Corresponding to the Scheme of FIG. 2c)

Finally, if the variant of the plant of FIG. 2c is chosen, an adiabatic ejection process in EIT will exclusively take place wherein the first and second share of the working fluid, coming from the thermodynamic states of points 8 and 11 respectively, reaching the pressure $P_E$ and temperature $T_E$ in wet saturated vapor phase as in FIG. 6c (point 12).

Transformations 13-1 or 12-1

Finally, the overall working fluid flow rate at pressure $P_E$ and temperature $T_E$ at the outlet in point 13 from EIT (variant of FIGS. 1 and 3), or $CP_2$ (variant of FIGS. 2a and 6a), or M (variant of FIGS. 2b and 6b) or even at the outlet in point 12 from EIT (variant of FIGS. 2c and 6c), is subject to a second isobaric thermal dissipation in the thermal dissipation means $D_2$, realizing the transfer of thermal power in the external environment and even exiting in wet saturated vapor phase (point 1) for the repetition of the entire sequence of thermodynamic transformations from the flow rate regulation valve S.

To summarize, in the plant working in said Heating-Cooling operating mode, the working fluid performs the supply to the end-user simultaneously of the following three power typologies:

a) Electric power and/or mechanical power, equal to the overall electric power and/or mechanical power produced in the expansion processes deducted of the overall electric power and/or mechanical power necessary for the powering of the compression means;

b) Heating power in the condenser CND (transformation 6-7);

c) Cooling power in the evaporator EVA (transformation 10-11).

As described, the plant according to the present invention is capable to operate also according to the operating modes, alternative to the previous one as well as one another, for the supply to the end-user of heating power only ("Heating" operating mode) or of cooling power only ("Cooling" operating mode), and always while the end-user is contextually supplied with electric power and/or mechanical power. These operating modes of the plant find a correspondence in the temperature-entropy (again, specific entropy) qualitative diagrams (T-s) modified according to the FIGS. 4 and 5 respectively, which will be briefly discussed hereafter.

With reference to the diagram T-s of FIG. 4 (as well as obviously still to FIG. 1) the "Heating" operating mode provides that the whole working fluid flow rate circulates in the first circuit according to the sequence of thermodynamic transformations 1-8 which is exactly corresponding to that above described for the "Heating-Cooling" operating mode. However, in point 8, at pressure $P_E$ and temperature $T_E$ the working fluid is deviated in $RD_2$ directly towards the thermodynamic state 1, being subject to the thermal dissipation in $D_2$ (transformation 8-1 analogous to the 12-1 or 13-1 of the previous "Heating-Cooling" operating mode). Thus, the working fluid performs the supply to the end-user of the overall electric power and/or mechanical power produced by the expanders deducted of the fraction necessary for the powering of the compression means, and of the thermal power in the condenser CND (transformation 6-7);

In the "Cooling" operating mode (scheme of FIG. 1 and diagram of FIG. 5, with diagrams modified as in FIGS. from 6a to 6c which will be applicable if the plant arrangement is one of those represented respectively in FIGS. from 2a to 2c), the flow rate regulation valve S divides the working fluid flow rate in the two shares. The evolution of the cycle in the diagram T-s differs from that of the "Heating-Cooling" operating mode for the only aspect that the first share of the working fluid bypasses the condensation process in CND due to the deviation branch $RD_1$, and thus the working fluid directly arrives in proximity of $P_E$ and $T_E$ due to the only adiabatic two-phase expansion, clearly in correspondence to an entropy value higher compared to the above mentioned "Heating-Cooling" operating mode, the other conditions being the same. In this way, the working fluid performs the supply to the end-user of the overall electric power and/or mechanical power produced in the expanders deducted of the fraction necessary for the powering of the compressor means, and cooling power in the evaporator EVA (transformation 10-11).

FIGS. 7 and from 8 to 10 depict a second embodiment, the plant arrangement and sequence of the thermodynamic transformations of which, represented in the diagram T-s, are identical to the homologous associated to the first embodiment, previously described, with the exception of the following difference. In particular, the second embodiment is characterized by a double thermal regeneration in the first circuit. In the first thermal regenerator $R_1$, the working fluid in the cold side and hot side are subject to the transformations 2-2' and 9-9', respectively; in the second thermal regenerator $R_2$, the working fluid cold side and hot side are subject to the transformations 3-3' and 6-6', respectively. The solution under consideration is also suggestive of further hypothesis with a higher number of thermal regenerations. The plant configuration and the respective diagrams T-s are substantially self-explanatory in light of the previous description of the first embodiment.

It can be noted that, in general, the portions of the several heat exchangers $R_{N-1}$, where the transfer of the heating power by the hot side working fluid takes place, and which are functionally associated with the first adiabatic expansion means $EP_{1,N+1}$ in the first circuit, can be all located upstream or all located downstream of the condensation means CND or even partly upstream and partly downstream of the condensation means CND. The numerals that mark the various thermodynamic states take into account the specific transformations of this case and therefore show obvious discrepancies compared to those used in the first embodiment (for example, the thermodynamic state in point 12 of the first embodiment corresponds to the thermodynamic state in point 14 of the second embodiment).

FIGS. 11 and 12 depict a third embodiment, the plant solution and sequence of the thermodynamic transformations of which, represented in the T-s diagram, are identical to the homologous associated with the first embodiment, previously described. Therefore, the figures are actually to be considered as self-explanatory. However, the third embodiment is characterized by the presence of two condensers $CND_1$ and $CND_2$ in the first circuit (each of which provides heating power to the respective end-user) and of two evaporators $EVA_1$ and $EVA_2$ in the second circuit (each of which provides cooling power to the respective end-user). The inactivation of the single condenser, in case of absence of heating power requested from the respective end-user, and the inactivation of the single evaporator, in case of absence of cooling power requested by the respective end-user, is obtained acting on couples of on-off valves which delimit the respective deviation branch. In particular, $RD_{1,1}$ and $RD_{1,2}$ are deviation branches in the first circuit associated with the first condenser $CND_1$ and second condenser $CND_2$, respectively. The couple of on-off valves $V_{1,1,1}$ and $V_{1,1,2}$ delimits $RD_{1,1}$ and the couple of on-off valves $V_{1,2,1}$ and $V_{1,2,2}$ delimits $RD_{1,2}$. Moreover, $RD_{3,1}$ and $RD_{3,2}$ represent deviation branches in the second circuit associated with the first evaporator $EVA_1$ and second evaporator $EVA_2$, respectively. The couple of on-off valves $V_{3,1,1}$ and $V_{3,1,2}$ delimits $RD_{3,1}$ and the couple of on-off valves $V_{3,2,1}$ and $V_{3,2,2}$ delimits $RD_{3,2}$.

By means of elementary and obvious modifications to the T-s diagram (and consequently to the scheme of the plant) it is possible to extend the invention in the case of a higher number of condenser (each of which supplies heating power to the respective end-user) and a higher number of evaporators (each of which supplies cooling power to the respective end-user), wherein the numbers of condensers is in general different from the number of evaporators.

Generally speaking, according to an aspect of the invention, there are provided first adiabatic two-phase compression means $CP_{1,N}$ in the first circuit comprising N compression stages with N≥2 and first adiabatic expansion means $EP_{1,N+1}$ comprising N+1 stages among which at least a final stage upstream of the third three way on-off valve $V_3$ only comprising adiabatic two-phase expansion means; likewise, the thermal regeneration means $R_{N-1}$ will include N−1 heat exchangers; finally, K condensation means $CND_K$ are provided in the first circuit (each of which supplies heating power to the respective end-user), M evaporation means $EVA_M$ are provided in the second circuit (each of which supplies cooling power to the respective end-user) and M second adiabatic two-phase expansion means $EP_{2,M}$ are provided in the second circuit, being in general K#M and possibly K=M.

The presently proposed plant and the method are capable to satisfy the electric power (and/or mechanical power), heating power and cooling power necessities of the end-user with considerably higher flexibility compared to both currently marketed CCHP plants and CCHP plants operating with two-phase fluid expanders and/or two-phase fluid compressors provided in the state of the art.

In particular, considering a CCHP plant of those currently marketed, wherein the device for the supply of cooling power to the end-user is an absorption or adsorption chiller, it generally works according to one of the two following regulation modes: 1) electric load chasing, wherein the electric power (or mechanical power) produced by the plant is equal to the electric power (or mechanical power) required by the end-user and at the same time the heating power produced by the plant can be higher or lower than the overall heating power required by the end-user (including the heating power required by said chiller); 2) thermal load chasing, wherein the heating power produced by the plant is equal to the overall heating power required by the end-user (including the heating power required by said chiller) and at the same time the electric power (or mechanical power) produced by the plant can be higher or lower than the electric power (or mechanical power) required by the end-user.

Analogous regulation modes are generally used in a CCHP plant of those currently marketed, wherein the device for the supply of cooling power to the end-user works according to the vapor compression refrigeration cycle: 1) electric load chasing, wherein the electric power (or mechanical power) produced by the plant is equal to the overall electric power (or mechanical power) required by the end-user (including the electric or mechanical power requested by said vapor compression refrigeration cycle) and at the same time the heating power produced by the plant can be higher or lower than the heating power required by the end-user; 2) thermal load chasing, wherein the heating power produced by the plant is equal to the heating power required by the end-user and at the same time the electric power (or mechanical power) produced by the plant can be higher or lower than the overall electric power (or mechanical power) required by the end-user (including the electric power or mechanical power required by said vapor compression refrigeration cycle).

In short, a commercial CCHP plant possesses modest flexibility because it allows the supply to the end-user of electric power (or mechanical power), heating power and cooling power in presence of surplus or deficit of power produced by the plant. In particular, the surplus of the heating power produced by the plant can be dissipated in the external environment or stored in suitable thermal energy storage means, the surplus of electric power (or mechanical power) can be fed into the electric grid (whether possible) or stored in suitable electric (or mechanical) energy storage means and finally the deficit of heating power or electric (or mechanical) power can be produced by the respective integration devices of the CCHP plant.

Compared to the CCHP plants currently on the market, the CCHP plants operating with two-phase fluid expanders and/or two-phase fluid compressors known in the art, in particular those described in [1], in general possess more flexibility. However, also compared to the latter, the plant and the method according to the present invention show significantly higher flexibility. In particular, the plant and the method according to the present invention allow the supply of the values simultaneously required by the end-user of electric power and/or mechanical power, heating power and cooling power in ranges having significantly higher extent (extent to be understood both in relation to the power values and in relation to those of the temperatures corresponding to the heating power and cooling power required by the end-user) compared to said CCHP plants, in absence of deficit or surplus of each of said three powers supplied by the present plant and method.

The remarkable flexibility of use of the plant according to the present invention takes on great importance in case of temporary variation of the value of at least one of the power typologies (electric, mechanical, heating, cooling) required by the end-user and/or of the values of at least one of the temperatures corresponding to the heating powers and/or to the cooling powers required by the end-user. Such considerable flexibility derives from the capability to supply the values of electric power (or mechanical power), heating power and cooling power required by the end-user and at the same time both the heating power and cooling power in correspondence to the respective value of temperature by means of the regulation of at least the following several process parameters independent of each other: each of the two shares of the working fluid flow rates circulating in the first and in the second circuit $C_1$ and $C_2$, respectively; vapor quality at the output of each of the two thermal dissipation means $D_1$ and $D_2$; pressure at the outlet of each stage of the first adiabatic two-phase compression means $CP_{1,N}$ in the first circuit; vapor quality at the outlet or temperature at the outlet of the vapor generation means GV in the first circuit; vapor quality at the outlet or temperature at the outlet of each condensation means $CND_K$ in the first circuit; vapor quality at the outlet or temperature at the outlet of each thermal regeneration mean hot side $R_{N-1}$ in the first circuit; pressure at the outlet of each stage of the first adiabatic expansion means $EP_{1,N+1}$ in the first circuit; pressure at the outlet of each stage of the second adiabatic two-phase expansion means $EP_{2,M}$ in the second circuit; vapor quality at the outlet of each evaporation mean $EVA_M$ in the second circuit; and finally, pressure at the outlet of the second adiabatic two-phase compression means, in particular the means $CP_2$ powered by use of a fraction of the mechanical or electric power generated by the same plant.

The regulation of these previously mentioned process parameters (and of possible others, depending on the specific embodiment) can take place by means of expedients and modes that are known to the skilled person and therefore not further here detailed. For example, the vapor quality at the outlet of a condensation means $CND_K$ in the first circuit and vapor quality at the outlet of an evaporation means $EVA_M$ in the second circuit are very simply controlled by means of the regulation of the heating power required by the end-user associated with $CND_K$ and the cooling power required by the end-user associated with $EVA_M$, respectively. Furthermore, and still by way of example, the regulation of the vapor quality at the outlet of a thermal regeneration hot side means $R_{N-1}$ in the first circuit consists in the regulation of the working fluid flow rate circulating in the same thermal regeneration hot side means by the respective flow rate regulation means and by the respective deviation means, located upstream of and in parallel to the same thermal regeneration hot side means, respectively.

Moreover, by acting on the on-off valves, as above described, the plant operation is set according to either of said three operating mode "Heating", or "Cooling" or even "Heating-Cooling", and it is also commanded the activation or deactivation of the single condenser and/or single evaporator in relation to the power requirements of the end-users.

Tests have been conducted, showing that the plant and the method of the present invention offer a second advantage, as important as the previous one, both compared to the currently marketed CCHP plants and compared to the CCHP plants operating with two-phase fluid expanders and/or two-phase fluid compressors in the state of the art. In particular, the plant and the method according to the present invention possess higher values of the thermodynamic performances indicators of the plant. It follows that a saving of the heating power transferred by the heat source to the working fluid in the vapor generator takes place, with the same electric power, heating power and cooling power supplied to the end-user.

The compression processes, performed by means of mechanical adiabatic two-phase compressors according to the above described modes, contribute to the achievement of the two previously mentioned advantages.

In particular, in relation to the increase of the thermodynamic performances indicators of the plant, for the sake of simplicity the plant under consideration is considered in absence of thermal regenerators, and then with a single mechanical adiabatic two-phase compressor in the first circuit. The use of such non-conventional technology implies, being the other conditions the same (including the values of the electric or mechanical power, heating power and cooling power supplied by the working fluid to the end-user), the increase of the enthalpy per unit mass at the outlet of said mechanical adiabatic two-phase compressor and therefore such use involves the two following opposite effects. The first effect consists in the increase in the first share of the working fluid flow rate circulating in the first circuit necessary for the supply of the predetermined electric power (or mechanical power) to the end-user. The second effect consists in the decrease of the difference of enthalpy per unit mass between the outlet and inlet of the vapor generator. The above mentioned first and second effect imply the growth and the reduction of the heating power transferred by the heat source to the working fluid in the vapor generator, respectively. There ensues that the latter heating power shows a minimum value in correspondence to a determined value of the enthalpy per unit mass at the outlet of the mechanical adiabatic two-phase compressor in the first circuit. In this situation, the thermodynamic performances indicators of the plant, which take into account the values both of the power supplied by the plant to the end-user (electric and/or mechanical, heating and cooling) and of the heating power transferred by the heat source to the plant in the vapor generator, assume maximum values.

On the other hand, the compression of the working fluid in the wet saturated vapor phase can be advantageously carried out in the plant according to the present invention, and in particular in the second circuit, using said non-conventional technology rather than the traditional technology for the separate compression of two phases (saturated liquid and dry saturated vapor). The latter provides separation of said two phases by means of a liquid-vapor separator, successive increase of the pressure of each of the two phases by means of the respective conventional device (circulation pump and single-phase compressor) up to the same value of the pressure at the outlet and finally mixing of said two pressurized phases. In particular, the following advantages can be a posteriori realized due to the use of the mechanical adiabatic two-phase compressor compared to said conventional technology:

- lower electric power (or mechanical power) necessary for the two-phase compressor in suitable operating conditions compared to that overall required for said traditional technology, with the same pressures at the inlet and outlet, flow rate and vapor quality at the inlet;
- requirement of use of a complex regulation/control system in the case of said traditional technology in order to obtain the same pressures at the outlet of the single-phase compressor and circulation pump with varying operating conditions, avoiding a significant reduction of the plant performances. On the contrary, in the case of two-phase compressor, said regulation/control system is absent;
- requirement of use of a liquid-vapor separator and a mixer in the case of said traditional technology. On the contrary, in the case of two-phase compressor, said devices are absent.

The achievement of said two advantages offered by the plant according to the present invention is also obtained due to the implementation of the thermal regeneration R as above described.

In particular, in relation to the increase of the thermodynamic performances indicators of the plant, for the sake of simplicity the plant under consideration is assumed in presence of a single thermal regenerator in the first circuit (FIG. 3). The increase of the heating power transferred by the working fluid in the thermal regenerator hot side to the same working fluid in thermal regenerator cold side determines, being the other conditions the same (including the values of the electric or mechanical power, heating power and cooling power supplied by the working fluid to the end-user), the following two opposite effects. The first effect consists in the increase of the difference of enthalpy per unit mass between the inlet and outlet of the mechanical adiabatic two-phase compressor located downstream of said thermal regenerator cold side and at the same time in the decrease of the difference of enthalpy per unit mass (in absolute value) between the inlet and outlet of the expander located downstream of said thermal regenerator hot side. There ensues the increase of the first share of the working fluid flow rate circulating in the first circuit necessary for the supply of the predetermined electric power (or mechanical power) to the end-user. The second effect consists in the decrease of the difference of enthalpy per unit mass between the inlet and outlet of the vapor generator. The above mentioned first and second effect imply the growth and the reduction of the heating power transferred by the heat source to the working fluid in the vapor generator, respectively. It follows that the latter heating power shows a minimum value in correspondence to a determined value of the heating power exchanged in the thermal regenerator of the first circuit. In this situation, the previously mentioned thermodynamic performances indicators of the plant assume maximum values.

Therefore, a further increase of said thermodynamic performances indicators of the plant can be achieved by use of several thermal regenerators in the first circuit according to the previously described mode, in each of which the heat exchange takes place in correspondence to appropriate values both of the heating power therein transferred and of the pressures related to the hot side working fluid and cold side working fluid circulating therein.

It is noted that in a generic thermodynamic cycle, the thermal regeneration can be performed according to several modes related to the following aspects: 1) presence or absence of the mass exchange between the two shares of the working fluid (hot side, cold side) in thermal contact; 2) location of the hot side and location of the cold side in the same thermodynamic cycle; 3) operating conditions of the thermodynamic cycle. Therefore, in a generic thermodynamic cycle, it is necessary to evaluate the favourable or unfavourable effect produced by thermal regeneration (namely the increase or decrease of the thermodynamic performances indicators of the same thermodynamic cycle, respectively) in relation to said realization modes of the thermal regeneration.

A still further contribution to the achievement of the two previously reported advantages, offered by the plant according to the present invention, is provided due to the implementation of expansion process of the working fluid in the wet saturated vapor phase by means of adiabatic two-phase expander. In particular, this non-conventional technology contributes to the increase of said thermodynamic performances indicators of the plant by performing the conversion of the thermodynamic energy of the working fluid into electrical energy (or mechanical energy). In fact, the possible use of a conventional Joule-Thomson valve, in lieu of said non-conventional technology, would imply the dissipation of the thermodynamic energy of the working fluid in the wet saturated vapor phase.

Finally, an additional contribution to the increase of said thermodynamic performances indicators of the plant according to the present invention is provided due to the implementation in the second circuit of the compression process of the working fluid in the wet saturated vapor phase by means of adiabatic two-phase ejector. In particular, such non-conventional technology in appropriate operating conditions determines the reduction or complete removal of the electric power (or mechanical power) required for the mechanical adiabatic two-phase compressors $CP_2$ in the second circuit.

The plant under consideration, as explained, can operate with a working fluid of typology "wet" or "dry" and in addition, such fluid can be single-component or multi-component azeotropic or also multi-component non-azeotropic. In the latter case, the composition of said fluid is established in such a way that the temperature trends of the working fluid during the isobaric condensation and isobaric evaporation are close to the temperature trends of the heating power and cooling power end-users, respectively (in fact, said temperature trends of the end-users are generally variable along the length of the condenser and evaporator). In this way, the reduction of the irreversibility related to said heat exchange is obtained, with resulting increase of the overall electrical power and/or mechanical power produced in the plant under consideration, with the same heating power transferred by the heat source to the working fluid in the vapor generator.

The thermal dissipation means $D_1$ and $D_2$ can be actual thermal dissipators or they can be replaced both (or one of them) by similar heat exchangers wherein the working fluid supplies heating power to the end-user. In other words, in this case the heating power is not dispersed in the external environment but it is supplied to the end-user.

This situation can take place in presence of an end-user requiring heating power in correspondence to several different values of the temperature, in particular the values of the temperature associated with the condensers and thermal dissipation means.

In the present description, the dissipation of thermal power towards the external environment is therefore to be intended as any means for the transfer of thermal power between the working fluid and thermal fluid, then actual thermal dissipators, i.e. heat exchangers wherein the thermal power of the working fluid is dispersed towards the external environment (e.g. atmospheric air, sea water or river or underground) because the temperature of the working fluid in said thermal dissipators is not high enough for the end-user, or heat exchangers which, if said temperature is high enough (it depends on the typology of the end-user and typology of the working fluid), are adapted to profitably provide such heating power to the same end-user rather than dispersing it.

The vapor generator, in relation to the phase of the working fluid exiting from it, will in practice be an economizer (fluid at the outlet is in the subcooled liquid phase or saturated liquid phase), an evaporator (fluid at the outlet is in the wet saturated vapor phase or dry saturated vapor phase), or a superheater (fluid at the outlet is in the superheated vapor phase or supercritical phase).

The phases of the working fluid in the previously described sequences of thermodynamic transformations have been indicated in relation to typical operating conditions, but obviously this does not represent a limiting aspect, the process according to the present invention being also capable to provide that the working fluid is in different phases from those of the above mentioned examples.

More in general, further variants and/or modifications can be brought to the plant and method for the supply to the end-user of electric power and/or mechanical power, heating power and/or cooling power according to the present invention, without departing from the field of protection of the same invention as defined by the attached claims.

BIBLIOGRAPHY

[1] Briola S. *Analisi delle prestazioni di cicli termodinamici di co-trigenerazione operanti con espansori e compressori a fluido bifase*, PhD thesis, University of Pisa, 2015.

[2] Welch P, Boyle P, Giron M, Sells M. *Construction and startup of low temperature geothermal power plants*, GRC Conference, San Diego, 2011.

[3] *Ebara's first two-phase expander installation reaches 30000 hours of successful operation*, http://www.ebaracryo.com/news/2431/ (accessed 14.12.2015).

[4] Infante Ferreira C A, Zaytsev D, Zamfirescu C. *Wet compression of pure refrigerants*, Int. Compressor Engineering Conference, Purdue University, 2006.

[5] Fabris G. *Rotating single cycle two-phase thermally activated heat pump*, U.S. Pat. No. 5,216,899, 08.06.1993.

[6] Pecz P, Hivessy G. *Hybrid heat pump*, U.S. Pat. No. 4,481,783, 13.11.1984.

[7] Colarossi M, Trask N, Schmidt D P, Bergander M J, *Multidimensional modeling of condensing two-phase ejector*, Int. Journal of Refrigeration, 2012; 35: 290-299.

The invention claimed is:

1. A plant for the supply of electric power, mechanical power, heating power and/or cooling power to an end-user by making use of a single working fluid configured to absorb heat transferred by a heat source, the plant comprising:
   i. isenthalpic flow rate regulation means configured to divide overall flow rate of said working fluid circulating in said plant into a first and second share of said working fluid;
   ii. downstream of said isenthalpic flow rate regulation means, a first circuit comprising:
      first adiabatic two-phase compression means configured to increase the pressure and consequently the temperature of said working fluid;
      isobaric vapor generation means for generating vapor of said working fluid thermally activated by heat transferred by said heat source;
      first adiabatic expansion means configured to generate said electric power and/or mechanical power due to expansion of said working fluid;
      isobaric condensation means configured to condense said working fluid with resulting supply of heating power to said end-user;
      isobaric thermal regeneration means functionally associated to said first adiabatic two-phase compression means and to said first adiabatic expansion means configured to promote a transfer of heating power from said working fluid circulating downstream of a stage of said first adiabatic expansion means to said working fluid circulating downstream of a stage of said first adiabatic two-phase compression means;
   iii) downstream of said isenthalpic flow rate regulation means, a second circuit comprising:
      first isobaric thermal dissipation means configured to promote the heat transfer from said working fluid to environment external to the plant;
      second adiabatic two-phase expansion means configured to generate said electric power and/or mechanical power due to expansion of said working fluid;
      isobaric evaporation means configured to evaporate said working fluid with resulting supply of cooling power to said end-user;
      second adiabatic two-phase compression means adapted to increase the pressure and consequently the temperature of said working fluid;

wherein said first and second circuit are in communication with each other, and configured to combine said first share of said working fluid when circulated in said first circuit downstream of said first adiabatic expansion means and said second share of said working fluid when circulated in said second circuit, in said second adiabatic two-phase compression means or downstream said first adiabatic expansion means and said second adiabatic two-phase compression means;

iv) a third circuit downstream of said second adiabatic two-phase compression means comprising, upstream of said isenthalpic flow rate regulation means, second thermal dissipation means configured to promote the transfer of thermal energy from said working fluid to the environment external to the plant; and v) bypass means comprising:
first deviation means configured to deviate said working fluid when circulated in said first circuit, bypassing respective condensation means ; and
second deviation means configured to deviate said working fluid between said first circuit downstream of said first adiabatic expansion means and said third circuit upstream of said second thermal dissipation means bypassing said second circuit : and vi) control means configured to distribute said working fluid between said circuits and said bypass means
whereby the plant is configured to the following alternative functionalities:
feeding said first share of said working fluid in said first circuit through said condensation means and said first adiabatic expansion means towards said second adiabatic two-phase compression means in said second circuit, for supplying electric power, mechanical power, heating power and cooling power;
deviating said first share of said working fluid in said first circuit through said first deviation means and said first adiabatic expansion means towards said second adiabatic two-phase compression means of for supplying electric power and/or mechanical power, and cooling power; and
feeding an overall flow rate of said working fluid in said first circuit through said condensation means and said first adiabatic expansion means and then through said second deviation means towards said third circuit of for supplying electric power and/or mechanical power, and heating power.

2. The plant according to claim 1, wherein said first deviation means comprise a first deviation branch for deviating said working fluid, said first deviation branch being delimited by a first and a second three way on-off valve located in said first circuit upstream and downstream of respective condensation means; and
said second working fluid deviation means comprise a second deviation branch that is delimited by a third three way on-off valve located downstream said first adiabatic expansion means and by a fourth three way on-off valve located between said second adiabatic two-phase compression means and said second thermal dissipation means.

3. The plant according to claim 2, wherein said by-pass means comprise third deviation means configured to deviate said working fluid in said second circuit, bypassing respective evaporation means; said third deviation means comprising a third deviation branch for deviating said working fluid, said third deviation branch being delimited by a first and a second three way on-off valve located in said second circuit upstream and downstream of respective evaporation means.

4. The plant according to claim 2, wherein said second adiabatic two-phase compression means in said second circuit comprise one or more adiabatic two-phase compressors driven by a part of the electric power and/or mechanical power wholly generated by the plant, isenthalpic mixing means being further provided for combining said first and second share of said working fluid, located downstream of said second adiabatic two-phase compression means and upstream of said fourth three way on-off valve .

5. The plant according to claim 2, wherein said second two-phase compression means in said second circuit comprise adiabatic two-phase ejection means configured to provide also to the combining between said first and second share of said working fluid.

6. The plant according to claim 2, wherein said second two-phase compression means in said second circuit comprise adiabatic two-phase ejection means configured to provide the combining between said first and second share of said working fluid, and one or more adiabatic two-phase compressors located upstream or downstream of said adiabatic two-phase ejection means and driven by a part of electric power and/or mechanical power wholly generated by the plant.

7. The plant according to claim 2, wherein said first adiabatic two-phase compression means in said first circuit comprise N compression stages with $N \geq 2$ and said first adiabatic expansion means in said first circuit comprise N+1 stages among which a final stage upstream of said third three way on-off valve exclusively comprising adiabatic two-phase expansion means; and wherein said isobaric thermal regeneration means comprise N−1 heat exchangers.

8. The plant according to claim 7, wherein said first adiabatic expansion means in said first circuit further comprise at least two stages upstream of said final stage, comprising adiabatic two-phase expanders, or adiabatic vapor turbines followed or preceded by adiabatic two-phase expanders.

9. The plant according to claim 7, wherein said isobaric thermal regeneration means functionally associated to said first adiabatic expansion means in said first circuit, and are positioned upstream of said condensation means downstream said condensation.

10. A method for the supply of electric power, mechanical power heating power and/or cooling power to an end-user by making use of a thermodynamic cycle of a single working fluid configured to absorb heat transferred by a heat source, the method comprising:
in a first operating mode:
feeding a first share of a flow rate of said working fluid, obtained by isenthalpic subdivision in the wet vapor phase, to a first sequence of thermodynamic transformations which provides:
a first adiabatic two-phase compression process in which the pressure and consequently the temperature of said working fluid increase;
an isobaric vapor generation process of said working fluid using heat transferred by said heat source;
a first adiabatic expansion process in which said electric power and/or mechanical power are generated due to expansion of said working fluid;
an isobaric thermal regeneration process functionally associated to a stage of said first adiabatic two-phase compression process and to said first adiabatic expansion process in which heat transfer takes place from said working fluid circulating downstream of a stage of said first adiabatic expansion process to said working fluid circulating downstream of said stage of said first adiabatic two-phase compression process;

in a second operating mode:
feeding a second share of said working fluid, obtained from said isenthalpic subdivision in wet vapor phase, to a second sequence of thermodynamic transformations which provides:
a first isobaric thermal dissipation process in which a first heat transfer is promoted from said working fluid to external environment;
a second adiabatic two-phase expansion process in which electric power and/or mechanical power are generated due to expansion of said working fluid;
an isobaric evaporation process of said working fluid with resulting supply of cooling power to the end-user;
a second adiabatic two-phase compression process in which the pressure and consequently the temperature of said working fluid increase;
wherein said first and second share of said working fluid are combined with each other downstream of said first adiabatic expansion process and second adiabatic two-phase compression process, and an overall flow rate of said working fluid is fed to a second isobaric thermal dissipation process in which a second heat transfer is promoted from said working fluid to the external environment;
and wherein, in an operating mode of the method for the supply as well as of electric power and/or mechanical power, heating power and cooling power, said first share of said working fluid is fed in said first sequence also to an isobaric condensation process in which said working fluid condenses with resulting supply of heating power to the end-user;
in a third operating mode:
in the third operating mode of the method for the supply as well as of electric power and/or mechanical power, and heating power;
feeding the overall flow rate of said working fluid in said first sequence and to said isobaric condensation process in which said working fluid condenses with resulting supply of heating power to the end-user; and
feeding the overall flow rate of said working fluid directly downstream of said second adiabatic two-phase compression process, to said second thermal dissipation process in which a second heat transfer is promoted from said working fluid to the external environment; and
wherein in the first, the second and the third operating modes, the overall flow rate of said working fluid downstream of said second thermal dissipation process is distributed in repetition of said thermodynamic cycle towards said first and/or second sequence.

11. The method according to claim 10, wherein said second adiabatic two-phase compression process in said second sequence consists of a second adiabatic mechanical compression process driven by a part of electric power and/or mechanical power wholly generated by said thermodynamic cycle, the combination between said first and second share of said working fluid being carried out by an isenthalpic mixing process downstream of said second adiabatic mechanical compression process and upstream of said second thermal dissipation process.

12. The method according to claim 10, wherein said second adiabatic two-phase compression process in said second sequence consists of an adiabatic two-phase ejection process in which the combining between said first and second share of said working fluid is also carried out.

13. The method according to claim 10, wherein said second adiabatic two-phase compression process in said second sequence comprises an adiabatic two-phase ejection process, in which the combining between said first and second share of said working fluid is also carried out, and an adiabatic mechanical compression process, upstream or downstream of said adiabatic two-phase ejection process and driven by a part of the electric power and/or mechanical power wholly generated by said thermodynamic cycle.

14. The method according to claim 10, wherein said first adiabatic two-phase compression process in said first sequence provides N compression stages with N≥2 and said first adiabatic expansion process in said first sequence provides N+1 expansion stages among which a final stage consisting of an adiabatic two-phase expansion process; and wherein in said isobaric thermal regeneration, N−1 heat transfer process stages are carried out.

15. The method according to claim 14, wherein said first adiabatic expansion process in said first sequence further comprises, upstream of said final stage, said adiabatic two-phase expansion processes, or adiabatic single-phase expansion processes followed or preceded by adiabatic two-phase expansion processes.

16. The method according to claim 14, wherein said isobaric thermal regeneration process, functionally associated to said first adiabatic expansion process in said first sequence, is entirely carried out upstream or downstream of said at least one isobaric condensation process, or partially upstream and partially downstream of said at least one isobaric condensation process.

* * * * *